United States Patent
Peers

(10) Patent No.: US 7,706,931 B2
(45) Date of Patent: Apr. 27, 2010

(54) CONTROL SYSTEM

(75) Inventor: Steven Peers, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/222,175

(22) Filed: Aug. 4, 2008

(65) Prior Publication Data

US 2008/0300734 A1 Dec. 4, 2008

Related U.S. Application Data

(62) Division of application No. 10/790,829, filed on Mar. 3, 2004, now abandoned.

(30) Foreign Application Priority Data

Mar. 26, 2003 (GB) ................................. 0307032.3

(51) Int. Cl.
*H04L 12/28* (2006.01)
*G06F 19/00* (2006.01)
(52) U.S. Cl. .............................. 701/2; 701/36; 701/102; 701/107; 370/401; 370/351
(58) Field of Classification Search ..................... 701/2, 701/107, 43; 370/237
See application file for complete search history.

(56) References Cited

U.S. PATENT DOCUMENTS

| | | | |
|---|---|---|---|
| 3,882,406 A | 5/1975 | Graves et al. | |
| 4,644,538 A | 2/1987 | Cooper et al. | |
| 4,920,939 A | 5/1990 | Gale | |
| 5,279,107 A | 1/1994 | Meisner et al. | |
| 5,974,453 A * | 10/1999 | Andersen et al. ............. 709/220 |
| 6,032,194 A * | 2/2000 | Gai et al. ...................... 709/239 |
| 6,108,300 A * | 8/2000 | Coile et al. ................... 370/217 |
| 6,424,258 B1 | 7/2002 | Claes | |
| 6,424,900 B2 | 7/2002 | Murray et al. | |
| 6,891,801 B1 * | 5/2005 | Herzog ........................ 370/237 |
| 2001/0029408 A1 | 10/2001 | Murray et al. | |
| 2002/0052960 A1* | 5/2002 | Trisno et al. ................. 709/226 |
| 2002/0131864 A1 | 9/2002 | Vos et al. | |
| 2003/0191565 A1 | 10/2003 | Ostrom et al. | |
| 2003/0205042 A1 | 11/2003 | Walker et al. | |
| 2004/0064221 A1 | 4/2004 | DePrez et al. | |
| 2005/0118021 A2 | 6/2005 | Vos et al. | |

FOREIGN PATENT DOCUMENTS

| | | |
|---|---|---|
| DE | 199 21 589 A1 | 11/2000 |
| EP | 0 942 555 A2 | 9/1999 |
| WO | WO 03/021894 A1 | 3/2003 |

* cited by examiner

*Primary Examiner*—Thomas G Black
*Assistant Examiner*—Lin B Olsen
(74) *Attorney, Agent, or Firm*—Oliff & Berridge, PLC

(57) ABSTRACT

A control system comprises: a plurality of input devices; a plurality of remote output devices; a plurality of dedicated connections and a digital data network interconnecting the plurality of input devices and the plurality of remote output devices. Each one of the plurality of output devices is connected to one of the plurality of input devices by an associated one of the plurality of dedicated connections. Each output device is operable to detect an addressing error in the digital network by comparing a value of a parameter received via its dedicated connection with the value of the same parameter received via the digital data network. Each output device is operable to use a network address dependent upon a value received via its dedicated connection.

2 Claims, 1 Drawing Sheet

CONTROL SYSTEM

Figure 1:
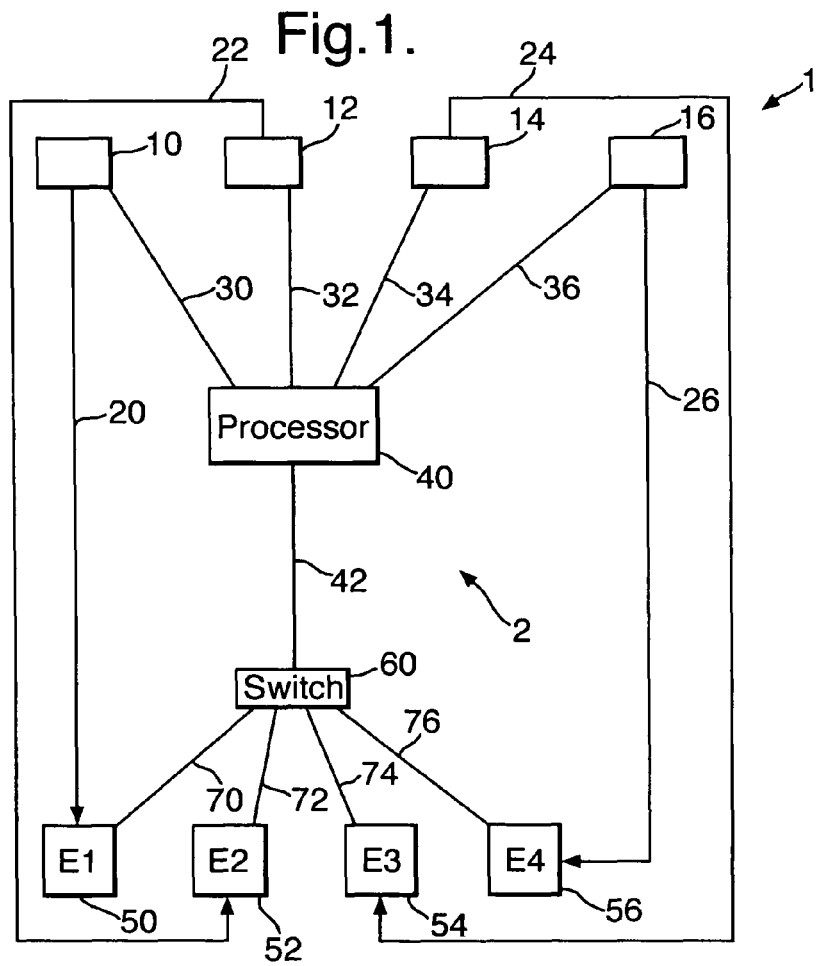

This is a Division of application Ser. No. 10/790,829 filed Mar. 3, 2004. The disclosure of the prior application is hereby incorporated by reference herein in its entirety.

Embodiments of the present invention relate to a control system, particularly control systems that have redundancy.

Previously in an aeroplane, each engine (or aero-engine, used below interchangeably) input and output function had redundancy of communication along separate dedicated hardwired communication paths. This redundancy meant that if one hardwired path should fail, the function can still be provided via the second hardwired path. Two dedicated hardwired communication paths are provided for each function eg throttle control, oil pressure etc. This results in a very complex wiring system which is difficult to design and maintain.

It would be desirable to network the engines using a digital data network so that data can be communicated to and from the engines without requiring a large number of dedicated hardwired communication paths. However, it is important that in such a system that data is communicated to the correct engine and that data from an engine can be correctly identified as from that engine.

According to one aspect of the present invention there is provided a control system comprising: a plurality of input devices; a plurality of remote output devices; a plurality of dedicated connections, wherein each one of the plurality of output devices is connected to one of the plurality of input devices by an associated one of the plurality of dedicated connections; and a digital data network interconnecting the plurality of input devices and the plurality of remote output devices, wherein each output device is operable to use a network address dependent upon a value received via its dedicated connection.

Thus a digital data network can be used reliably to control the output devices. The control system can establish a correct network configuration such that the output devices are correctly addressed. This allows the control system to be used, for example, in an aeroplane, where the output devices are aero-engines.

According to another aspect of the present invention there is provided an aero-engine system comprising:
a first input for receiving a dedicated connection to a first thrust control device;
an interface for communicating with a digital data network connected to a plurality thrust control devices including the first thrust control device; and
network control means for controlling the reception and transmission of data packets via the digital data network and operable to use a network address dependent upon a value received via the first input.

According to a further aspect of the present invention there is provided a method of configuring a networked aero-engine comprising the steps of:
providing a network thrust setting for each one of a plurality of engines to the aero-engine via a digital data network;
providing a dedicated thrust setting to the aero-engine via a dedicated connection; and
automatically assigning a network address, at the aero-engine, in dependence upon which one of the network thrust settings corresponds to the dedicated thrust setting.

According to a still further aspect of the present invention there is provided a method of configuring networked aero-engines comprising the steps of:
setting the thrust controls for the aero-engines to a predetermined configuration in which each thrust control has a different setting; informing each of the aero-engines using a digital data network of the configuration of the thrust controls; and automatically assigning a network address, at an aero-engine, in dependence upon the thrust setting indicated for that engine by a dedicated connection and the configuration of the thrust controls.

According to another aspect of the invention there is provided a control system comprising:
a plurality of input devices; a plurality of remote output devices; a plurality of dedicated connections, wherein each one of the plurality of output devices is connected to one of the plurality of input devices by an associated one of the plurality of dedicated connections; and
a digital data network interconnecting the plurality of input devices and the plurality of remote output devices, wherein each output device is operable to detect a digital network configuration error by comparing a value of a parameter received via its dedicated connection with the value of the same parameter received via the digital data network.

Thus a digital data network can be used reliably to control the output devices. The control system can detect an incorrect network configuration such that the output devices are incorrectly addressed.

According to a further aspect of the invention there is provided an aero-engine system comprising:
a first input for receiving a dedicated connection to a first thrust control device; an interface for communicating with a digital data network connected to a plurality thrust control devices including the first thrust control device; and network control means for controlling the reception and transmission of data packets via the digital data network and operable to detect a digital network configuration error by comparing a value of the thrust setting received via its dedicated connection with the value of the thrust setting received via the digital data network.

Figure 2:
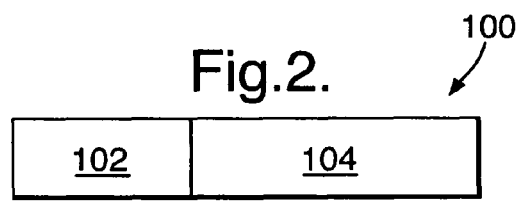
Figure 3:
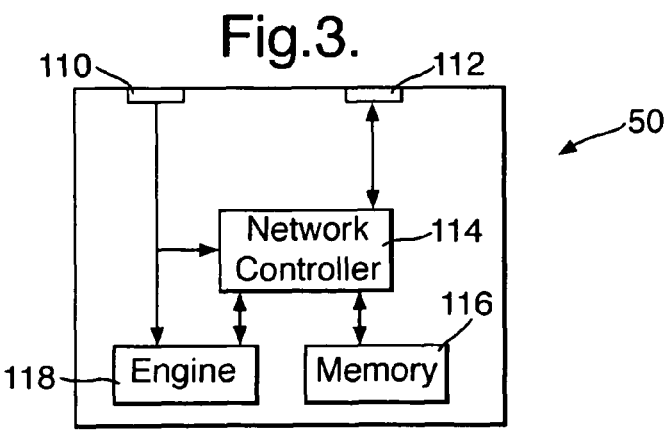

For a better understanding of the present invention, reference will now be made by way of example only to:

FIG. 1 illustrates a networked control system;
FIG. 2 illustrates a data packet; and
FIG. 3 illustrates an output device.

FIG. 1 illustrates a control system (1) comprising: a plurality of input devices (10, 12, 14, 16); a plurality of remote output devices (50, 52, 54, 56); a plurality of dedicated connections (20, 22, 24, 26), wherein each one of the plurality of output devices (50, 52, 54, 56) is connected to one of the plurality of input devices (10, 12, 14, 16) by an associated one of the plurality of dedicated connections (20, 22, 24, 26); and a digital data network (2) interconnecting the plurality of input devices (10, 12, 14, 16) and the plurality of remote output devices (50, 52, 54, 56), wherein each output device (50, 52, 54, 56) is operable to use a network address dependent upon a value received via its dedicated connection.

In more detail FIG. 1 illustrates a networked control system 1. The control system 1 comprises a plurality of man machine interfaces 10, 12, 14, 16; a processor 40; a switch 60; and a plurality of output devices 50, 52, 54 and 56.

The plurality of man machine interfaces (MMI) include a first MMI 10, a second MMI 12, a third MMI 14 and a fourth MMI 16. The plurality of output devices include a first output device 50 associated with the first MMI 10, a second output device 52 associated with the second MMI 12, a third output device 54 associated with the third MMI 14 and a fourth output device 56 associated with the fourth MMI 16.

The first, second, third and fourth MMIs are electrically connected to the first, second, third and fourth output devices via a digital data network 2.

The first, second, third and fourth MMIs are electrically connected, separately, to the processor 40 via the respective first, second, third and fourth digital data buses 30, 32, 34, 36. The processor 40 is electrically connected to the switch 60 via the fifth digital data bus 42. The switch 60 is electrically connected, separately, to each of the first, second, third and fourth output devices via the respective sixth, seventh, eighth and ninth digital data buses 70, 72, 74 and 76.

The first MMI 10 is electrically connected to the first output device 50 by a first dedicated hardwired connection 20. The second MMI 12 is electrically connected to the second output device 52 by a second dedicated hardwired connection 22. The third MMI 14 is electrically connected to the third output device 54 by a third dedicated hardwired connection 24. The fourth MMI 16 is electrically connected to the fourth output device 56 by a fourth dedicated hardwired connection 26.

In one embodiment, the network 2 is used to control the engines of a four engine aeroplane. The first output device 50 is the outer port engine. The second output device 52 is the inner port engine. The third output device 54 is the inner starboard engine. The fourth output device 56 is the outer starboard engine.

The first MMI 10 includes a throttle control, for the outer port engine, which can have any one of a number of settings. The first dedicated hardwired connection 20 sends the setting of the throttle control for the outside port engine to the first output device 50 to control its throttle setting.

The second MMI 12 includes a throttle control, for the inner port engine, which can have any one of a number of settings. The second dedicated hardwired connection 22 sends the setting of the throttle control for the inner port engine to the second output device 52 to control its throttle setting.

The third MMI 14 includes a throttle control, for the inner starboard engine, which can have any one of a number of settings. The third dedicated hardwired connection 24 sends the setting of the throttle control for the inner starboard engine to the third output device 54 to control its throttle setting.

The fourth MMI 16 includes a throttle control, for the inner starboard engine, which can have any one of a number of settings. The fourth dedicated hardwired connection 26 sends the setting of the throttle control for the outer starboard engine to the fourth output device 56 to control its throttle setting.

The network 2 communicates using packet data. FIG. 2 illustrates a packet 100. The packet 100 has a preamble header portion 102 and a payload portion 104. The payload 104 carries the data to be communicated. The header portion 102 is used to identify the source and the destination of the packet. Unique network addresses are used to uniquely identify the correct destination/source.

The address Address_OutputDevice_1 is reserved for the first output device 50 only. The address Address_OutputDevice_2 is reserved for the second output device 52 only. The address Address_OutputDevice_3 is reserved for the third output device 54 only. The address Address_OutputDevice_4 is reserved for the fourth output device 56 only. It is also possible to send a data packet to more than one destination if they have a common broadcast address. The address Address_OutputDevice is reserved for sending a data packet simultaneously to the first, second, third and fourth output devices only.

The network 2 is used to send redundant values for the throttle settings.

The first throttle setting from the first MMI 10 is received by the processor 40. The processor 40 creates a first data packet 100 which is sent to the switch 60. The first packet header has a destination address (Address_OutputDevice_1) identifying only the first output device 50 as the destination and a payload specifying the first throttle setting. The first output device 50 recovers the first throttle setting from the payload 104.

The second throttle setting from the second MMI 12 is received by the processor 40. The processor 40 creates a second data packet 100 which is sent to the switch 60. The second packet header has a destination address (Address_OutputDevice_2) identifying only the second output device 52 as the destination and a payload specifying the second throttle setting. The second output device 52 recovers the second throttle setting from the payload 104.

The third throttle setting from the third MMI 14 is received by the processor 40. The processor 40 creates a third data packet 100 which is sent to the switch 60. The third packet header has a destination address (Address_OutputDevice_3) identifying only the third output device 54 as the destination and a payload specifying the third throttle setting. The third output device 54 recovers the third throttle setting from the payload 104.

The fourth throttle setting from the fourth MMI 16 is received by the processor 40. The processor 40 creates a fourth data packet 100 which is sent to the switch 60. The fourth packet header has a destination address (Address_OutputDevice_4) identifying only the fourth output device 56 as the destination and a payload specifying the fourth throttle setting. The packet is routed to the fourth output device 56 using the destination address. The third output device 56 recovers the fourth throttle setting from the payload 104.

Under normal operating conditions, the value of the throttle setting received as a data packet at a particular output device and the value received via its dedicated hardwired connection are the same.

In the event that the network 2 is incorrectly configured or not yet configured so that the network 2 is not using correct addresses, the value of the throttle setting received at an output device via the network 2 will be different from the value received via the dedicated hardwired connection. The output device is arranged to detects this and set an alert.

The network 2 can be automatically configured or reconfigured in response to the alert by setting the throttle controls of the first, second, third and fourth MMIs into a predetermined configuration. Each one of the first, second, third and fourth throttle controls is set to a predetermined and different setting. The processor 40 detects that the output throttle settings provided by the MMIs have the predetermined configuration and enters a 'set-up' mode.

In the 'set-up' mode the processor 40 creates a 'set-up' data packet that is addressed to all the output devices using Address_OutputDevice as the destination address in the header.

The payload of the 'set-up' packet has a predetermined format. The payload separately identifies the first throttle setting received from the first MMI 10, the second throttle setting received from the second MMI 12, the third throttle setting received from the third MMI 14, and the fourth throttle setting received from the fourth MMI 16.

The packet is sent by the processor 40 to switch 60. Each of the output devices 50, 52, 54 and 56 receives the 'set-up' packet. The header of the packet identifies the packet as a 'set-up' packet.

FIG. 3 is a schematic illustration of an output device. In this Figure only the first output device 50 is illustrated as an example, but the other output devices are similarly arranged. The first output device has an input 110 for connection to the dedicated hardwired connection 20, an interface 112 for connection to the network 2 via the fifth data bus 70, a network controller 114 connected to the input 110 and the interface 112, a read only memory 116 connected to the network controller 114 and aero-engine components 118 connected to the network controller 114 and the input 110.

The network controller 114 of each one of the output devices detects that a 'set-up' packet has been received from the contents of the received packet header and enters a set-up mode. The network controller 114 determines whether it is located in the first, second, third or fourth output device by comparing the throttle value setting received from the dedicated hardwired connection via the input 110 with each of the first, second, third and fourth throttle settings received in the payload of the 'set-up' packet. If there is identity with the first throttle value, then the network controller 114 determines that it is in the first output device 50 and uses the address Address_OutputDevice_1. If there is identity with the second throttle value, then the network controller 114 determines that it is in the second output device 52 and uses the address Address_OutputDevice_2. If there is identity with the third throttle value, then the network controller 114 determines that it is in the third output device 54 and uses the address Address_OutputDevice_3. If there is identity with the fourth throttle value, then the network controller 114 determines that it is in the fourth output device 56 and uses the address Address_OutputDevice_4.

Each read only memory 116 permanently stores the address values: Address_OutputDevice, Address_OutputDevice_1, Address_OutputDevice_2, Address_OutputDevice_3, and Address_OutputDevice_4.

The network controller 114 uses one of Address_OutputDevice_1, Address_OutputDevice_2, Address_OutputDevice_3, and Address_OutputDevice_4 as its active address once it determines whether it is in the first, second, third or fourth output device.

Although the preceding example relates to a four engine aeroplane, it should be realised that embodiments of the invention can find application in any multi-engine aeroplane.

Although embodiments of the present invention have been described in the preceding paragraphs with reference to various examples, it should be appreciated that modifications to the examples given can be made without departing from the scope of the invention as claimed. For example, embodiments of the invention may find application in a distributed process or plant controller.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A method of configuring networked aero-engines comprising the steps of: providing a network thrust setting to each one of a plurality of aero-engines via a digital data network; providing a dedicated thrust setting to each aero-engine via a dedicated connection; and automatically assigning a network address, at the aero-engine, in dependence upon which one of the network thrust settings corresponds to the dedicated thrust setting.

2. A method of configuring networked aero-engines comprising the steps of: setting the thrust controls for the aero-engines to a predetermined configuration in which each thrust control has a different setting; informing each of the aero-engines using a digital data network of the configuration of the thrust controls; and automatically assigning a network address, at each aero-engine, in dependence upon the thrust setting indicated for that aero-engine by a dedicated connection and the configuration of the thrust controls.

* * * * *